April 3, 1951

T. JACKSON 2,547,010

AIRCRAFT ENGINE STARTER

Filed July 5, 1946

3 Sheets-Sheet 1

INVENTOR.
Thomas Jackson
BY
Hauke & Fadely
ATTORNEYS

April 3, 1951  T. JACKSON  2,547,010
AIRCRAFT ENGINE STARTER
Filed July 5, 1946  3 Sheets-Sheet 2
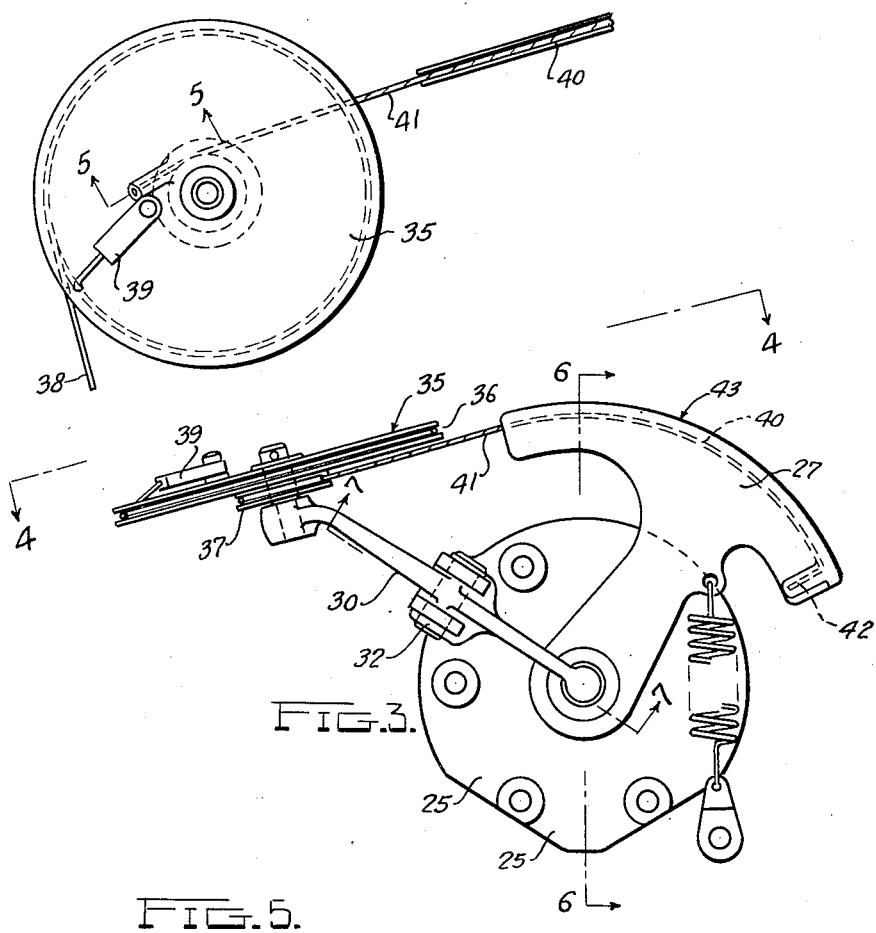
INVENTOR.
Thomas Jackson
BY
Hauks & Hardesty
ATTORNEYS April 3, 1951 T. JACKSON 2,547,010
AIRCRAFT ENGINE STARTER
Filed July 5, 1946 3 Sheets-Sheet 3
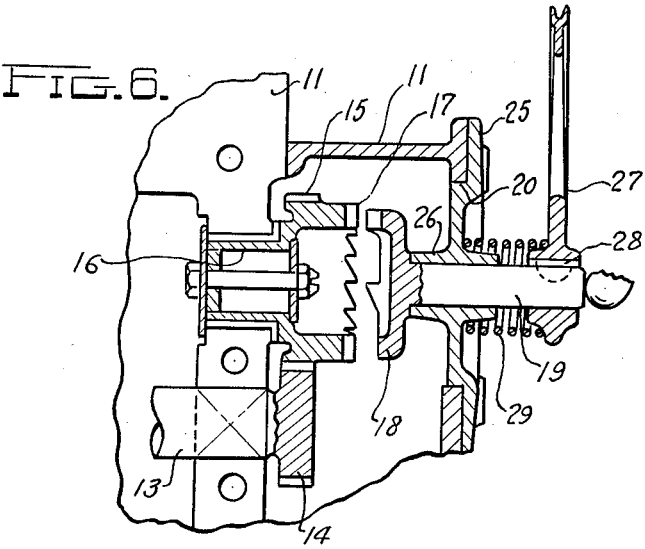
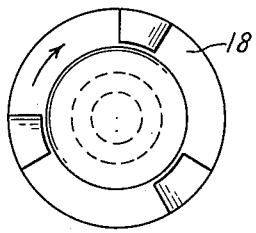
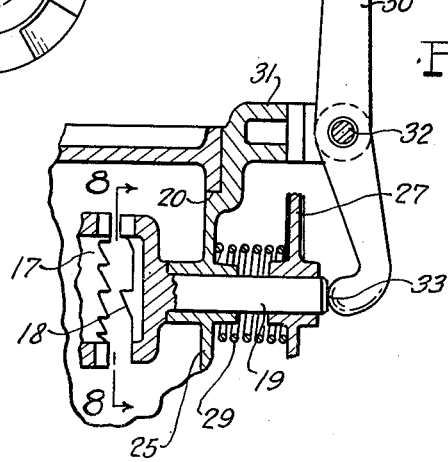
INVENTOR.
Thomas Jackson
BY
Hauke & Hardesty
ATTORNEYS Patented Apr. 3, 1951

2,547,010

UNITED STATES PATENT OFFICE 2,547,010

AIRCRAFT ENGINE STARTER

Thomas Jackson, North Muskegon, Mich., assignor to Continental Motors Corporation, Muskegon, Mich., a corporation of Virginia Application July 5, 1946, Serial No. 681,576

4 Claims. (Cl. 123—185)

My invention relates to engine starters and more particularly to a manually operated mechanism particularly applicable for assembly with an aircraft engine.

It is often impractical to provide aircraft engines with electric starters, particularly aircraft engines generally employed for powering light commercial planes, because such electric mechanisms require heavy parts and the carrying of an auxiliary six or twelve volt battery to actuate the starter generator carried by said engine. As a result, the majority of engines which power these light planes are not equipped with electric starters and generally resort to hand cranking of the propeller to start the engine.

An object of my present invention is to provide a simple mechanical starting means for engines of this type which power these light planes by constructing the mechanisms in such a way as to provide the minimum number of mechanical parts which may be readily assembled to the engine in the minimum space allotted and which do not materially add to the over-all weight.

A further object of the invention is to provide a manually operated starter mechanism of compact design and which is easily actuated by means extending to the instrument panel of the airplane thereby permitting engine starting by a simple pull on the cable which extends from said instrument panel to the starter mechanism.

A still further object of my invention is to provide a simplified manually operated starter mechanism for airplane engines of the type particularly applicable for powering light airplanes by constructing said mechanism to provide a compact assembly and one in which a continuous movement of the actuating means actuates said mechanism to first engage a clutching mechanism and subsequently rotate same to start the engine.

Figure 1:
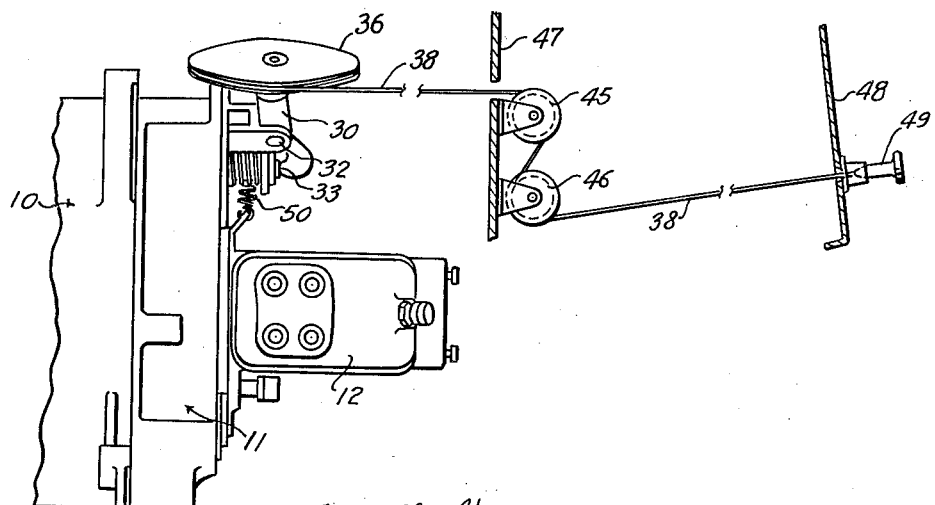
Figure 2:
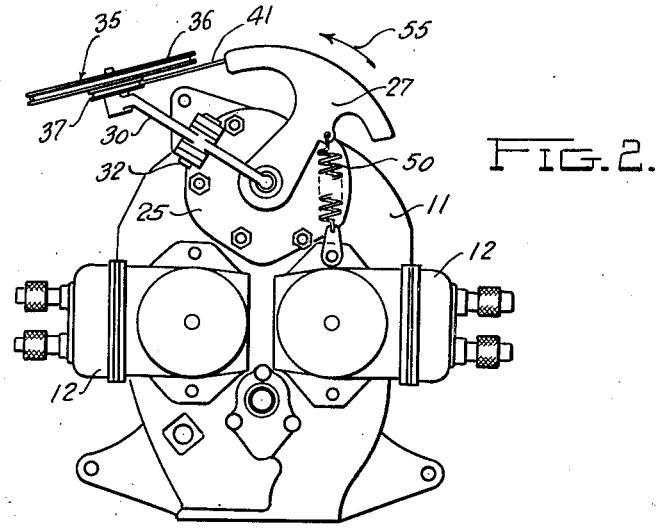

For a more detailed understanding of my invention, reference may be had to my accompanying drawings illustrating a preferred embodiment thereof in which like characters refer to like parts throughout the several views and in which:

Fig. 1 is a fragmentary side elevational view of an engine showing a gear case secured thereto and the manually operated starter mechanism assembled therewith, Fig. 2 is a rear elevational view thereof, Fig. 3 is an enlarged rear elevational view of the starting mechanism, Fig. 4 is a plan view of the sheave carried by the clutch actuating lever arm and taken substantially on the line 4—4 of Fig. 3, Fig. 5 is a fragmentary detail view showing means for anchoring the cable taken on line 5—5 of Fig. 4, Fig. 6 is a longitudinal sectional view through the starting mechanism and taken substantially on line 6—6 of Fig. 3, Fig. 7 is a detail sectional view of the clutch actuating means and taken substantially on the line 7—7 of Fig. 3, and Fig. 8 is a detail sectional view of the clutch element taken substantially on the line 8—8 of Fig. 7.

The invention, by preference, is herein illustrated as applied to an aircraft engine of conventional construction, a fragmentary portion of said engine being illustrated in Fig. 1 by reference character 10. A gear case 11 is secured to the rear end of said engine and carries suitable gearing (not shown) for actuating the magnetos 12 and other engine accessories in the customary manner. A portion of the engine crankshaft 13 is illustrated in Fig. 6 and carries a gear 14 which meshes with gear 15 carried by a stub shaft 16 supported by the engine crankcase and is provided with a suitable clutch element 17 which is adapted to be engaged by clutch element 18 carried on shaft 19 of the starter mechanism.

The gear case 11 is provided with an opening 20 on the face thereof, axially aligned with the shaft 16 and clutch element 17. The support or gear case cover plate 25 is bolted or otherwise secured to said gear case and carries a bearing hub 26 which rotatably supports said shaft 19 and also permits axial movements of said shaft. A crank 27 is keyed as at 28 to said shaft 19 and a spring 29 yieldingly engages the crank and urges the shaft 19 away from the engine so as to normally hold the clutch elements 17 and 18 out of engagement.

Means to engage these clutch elements is carried by said cover plate 25 and comprises a lever arm 30 which is fulcrumed on an extension 31 carried by said plate as at 32. One end of said lever arm 30 engages the end of shaft 19 as at 33 and the other end thereof rotatably supports a compound sheave 35. This compound sheave comprises a large pulley element 37. A rope 38 engages the large sheave 36, said rope being anchored thereto as at 39 in a well known manner. The crank 27 is provided with a groove 40 and a second rope 41 lies in said groove and is secured to the crank as at 42. Preferably the crank 27 comprises an arcuate portion 43 for supporting the rope 41 so that the said rope 41 is properly aligned with the pulley 37 at all times. The operation of the starter mechanism is had by pulling on said rope 38, said rope winding over pulleys 45 and 46 carried by a fire wall 47 and extending to the instrument panel 48 and connected with the hand pull 49. On pulling said rope 38, by means of said hand pull, the rotation of the large pulley 36 is resisted by reason of the fact that same is connected with the crank, the movement of which is resisted by a relatively strong spring 50. Thus the first pull of rope 38 serves to rock the lever arm 30 and shift the shaft 19 so as to engage the clutch elements 17 and 18. Further movement of said shaft is limited by the engagement of these clutch elements and thus further pull on said rope 38 will rotate pulley 36 and 37, thereby winding said rope 41 on said pulley 47 and oscillating the crank 37 in the direction as shown by arrow 55, thereby rotating said shaft 19 and said engine shaft 13 for starting said engine.

It will thus be seen that the present starting mechanism is operable with one continuous movement of the actuating means and as a result, the clutch members are engaged and rotated on starting the engine. Preferably, the mechanism is so constructed as to operate the clutch engaging means prior to rotation of said clutches, to rotate the engine shaft.

It will be apparent to those skilled in the art to which my invention pertains, that various modifications and changes may be made therein without departing from the spirit of my invention or from the scope of the appended claims.

I claim:

1. A manual engine starting mechanism comprising a clutch assembly having driving and driven members normally positioned out of engagement, said driving clutch member comprising a shaft carrying a clutch element at one end and supported for axial movement to engage and disengage said clutch members, manually operable means connected with said shaft to rotate same, said means comprising a crank arm keyed to said shaft and a cable attached to said crank arm, and means shifting said shaft to engage said clutch members and comprising a pivotally supported lever operable in a plane extending coaxially of said shaft, one end of said lever engaging said shaft and a compound sheave rotatably supported by the other end of said lever, said crank actuating cable attached to said sheave, and a second cable attached to said compound sheave and manually actuated to first rock said lever to axially shift said shaft and then operable to rotate said sheave to wind said crank cable to actuate said crank for rotating said shaft upon engagement of said clutch members.

2. A manual engine starting mechanism comprising a clutch assembly having driving and driven members normally positioned out of engagement, said driving clutch member comprising a shaft carrying a clutch element at one end and supported for axial movement to engage and disengage said clutch members, manually operable means connected with said shaft to rotate same, said means comprising a crank arm keyed to said shaft and a cable attached to said crank arm, and means shifting said shaft to engage said clutch members and comprising a pivotally supported lever operable in a plane extending coaxially of said shaft, one end of said lever engaging said shaft and a compound sheave rotatably supported by the other end of said lever, said crank actuating cable attached to said sheave, and a second cable attached to said compound sheave and manually actuated to first rock said lever to axially shift said shaft and then operable to rotate said sheave to wind said crank cable to actuate said crank for rotating said shaft upon engagement of said clutch members, said free end of said second cable attached to a hand pull supported on the instrument panel of an airplane vehicle.

3. In an engine, a gear case carried by said engine, an engine starter mechanism mounted on said gear case, an engine driven member supported by said engine and having a driven clutch element, said starter mechanism comprising a plate secured to said gear case, a shaft rotatably supported by said plate and axially movable in said plate, a clutch element carried by said shaft, said shaft movable axially to engage said clutch elements, spring means normally holding said clutch elements out of clutching engagement, a crank carried by said shaft, a lever pivotally supported by said plate and having one end abutting the end of said shaft, said other end of said lever carrying a compound sheave, a rope attached to said sheave and operable to rock said lever to axially move said shaft for engaging said clutch elements, a second rope attached to said crank and to said compound sheave, and further pull on said first rope rotating said sheave and thereby actuating said crank to rotate said shaft upon engagement of said clutch elements.

4. In an engine, a gear case carried by the engine, a gear case cover plate, a manual engine starting mechanism comprising a clutch assembly having a driving member normally positioned out of engagement with a driven member on said engine, said driving clutch member comprising a shaft carrying a clutch element at one end and supported by said cover plate for axial movement to engage and disengage said driving and driven members, a lever secured to said shaft externally of said cover plate, an arm pivotally mounted on the cover plate and connected with said shaft to axially move same to engage said clutch members and a manually actuated starter cord anchored to said lever and connected with said arm and operable to first rock said arm to engage the clutch members and to subsequently actuate the lever to rotate the shaft.

THOMAS JACKSON.

REFERENCES CITED

The following references are of record in the file of this patent:

UNITED STATES PATENTS

| Number | Name | Date |
| --- | --- | --- |
| 1,023,212 | Mallins | Apr. 16, 1912 |
| 1,168,134 | Welliver | Jan. 11, 1916 |